(12) United States Patent
Rodgers

(10) Patent No.: US 11,436,764 B2
(45) Date of Patent: Sep. 6, 2022

(54) DYNAMIC GENERATION AND DELIVERY OF SCALABLE GRAPHIC IMAGES IN WEB APPLICATIONS

(71) Applicant: Oracle International Corporation, Redwood Shores, CA (US)

(72) Inventor: Michael Patrick Rodgers, Lake Oswego, OR (US)

(73) Assignee: Oracle International Corporation, Redwood Shores, CA (US)

( * ) Notice: Subject to any disclaimer, the term of this patent is extended or adjusted under 35 U.S.C. 154(b) by 6 days.

(21) Appl. No.: 16/533,314

(22) Filed: Aug. 6, 2019

(65) Prior Publication Data
US 2021/0042966 A1 Feb. 11, 2021

(51) Int. Cl.
| | |
|---|---|
| *G06F 16/58* | (2019.01) |
| *G06T 11/00* | (2006.01) |
| *G06F 3/04817* | (2022.01) |
| *G06F 16/583* | (2019.01) |
| *G06T 1/60* | (2006.01) |
| *G06F 40/14* | (2020.01) |
| *G06F 40/103* | (2020.01) |

(52) U.S. Cl.
CPC ........ *G06T 11/001* (2013.01); *G06F 3/04817* (2013.01); *G06F 16/5838* (2019.01); *G06F 40/103* (2020.01); *G06F 40/14* (2020.01); *G06T 1/60* (2013.01)

(58) Field of Classification Search
CPC ..... G06T 11/001; G06T 1/60; G06F 16/5838; G06F 40/103; G06F 40/14; G06F 3/04817

USPC ......................................................... 715/234
See application file for complete search history.

(56) References Cited

U.S. PATENT DOCUMENTS

| | | | | |
|---|---|---|---|---|
| 2003/0113038 A1* | 6/2003 | Spencer | ............... | G06F 16/986 382/305 |
| 2005/0268229 A1* | 12/2005 | Wessling | .............. | G06F 40/186 715/275 |
| 2014/0176563 A1* | 6/2014 | Kaasila | ................. | G06F 40/109 345/467 |
| 2015/0019368 A1* | 1/2015 | Matteucci | .......... | G06Q 30/0621 705/26.5 |
| 2017/0293592 A1* | 10/2017 | He | ......................... | G06F 40/117 |
| 2018/0329996 A1* | 11/2018 | Perkins | .................... | G06F 16/50 |
| 2019/0043231 A1* | 2/2019 | Uzgin | ..................... | G06F 16/54 |

* cited by examiner

*Primary Examiner* — Hope C Sheffield
(74) *Attorney, Agent, or Firm* — Kilpatrick Townsend & Stockton LLP

(57) ABSTRACT

To dynamically re-color scalable graphic images in web applications, a server may send an image filename to a web application operating on a client device. Before displaying the image, the client device may send a request back to the server identifying the image and providing color codes for the image. The server may load an image file for the identified image and replace generic placeholders in the image file with the color codes sent from the client device. The re-colored image file may then be sent back to the client device for display. The server may receive subsequent requests to re-color the image using different color codes in response to user inputs at the client device, such as clicking or hovering over the image.

19 Claims, 13 Drawing Sheets

DYNAMIC GENERATION AND DELIVERY OF SCALABLE GRAPHIC IMAGES IN WEB APPLICATIONS

BACKGROUND

The growing variety of devices, display resolutions, and screen sizes has generated a need for scalable image formats that maintain their resolution and sharpness at any size. Traditional raster images, or bitmaps, include a fixed set of colored pixels. Basic raster file types include JPG, GIF, and PNG images. While these file types are commonly used for storing and displaying photographs and other real-world images, they are not ideal for displaying computer-generated graphic objects that are scaled based on varying display devices. Zooming in on a raster image produces pixelization and blurring, while zooming out causes the display to obscure details in the image.

In contrast to raster images, scalable graphic images, or vector images, may designate graphic objects and use mathematical equations to generate the corresponding displayed images. Definitions for these objects and equations may be stored in a markup language format that can be rendered at any resolution and on any size display. Scalable graphic images are resolution-independent, and can scale to any dimension without losing quality. Web applications simply recalculate the math used to create the image to avoid any distortion. Scalable graphic images are also natively compatible with web code, such as HTML, JavaScript, or CSS. Compared to raster images, scalable graphic images use relatively compact file sizes that reduce bandwidth and storage space when operating web applications.

Despite these advantages, traditional raster images cannot always be replaced with scalable graphic images and web applications. Although some language tags and web applications are designed specifically to handle scalable graphic images, not all language tags are as compatible. Because web languages are not specifically designed throughout to handle the various attributes and functions of scalable graphic images, various problems arise when client devices need to alter scalable graphic images dynamically at runtime.

SUMMARY

To dynamically re-color scalable graphic images in web applications, a server may send an image filename to a web application operating on a client device. Before displaying the image, the client device may send a request back to the server identifying the image and providing color codes for the image. The server may load an image file for the identified image and replace generic placeholders in the image file with the color codes sent from the client device. The re-colored image file may then be sent back to the client device for display. The server may receive subsequent requests to re-color the image using different color codes in response to user inputs at the client device, such as clicking or hovering over the image.

Methods, systems, and computer-readable mediums may include steps or perform operations that dynamically re-color scalable graphic images. To re-color an image, a server may receive a request from a client device. The request may include a URL that includes an image identifier, such as a filename or file path. The URL may also include one or more color identifiers that specify color codes, such as six-digit hexadecimal values, RGB triples, etc. The client device may include any type of computing device. For example, a web application operating on a mobile device may use a scalable graphic image as an icon or a background image for control. The server may include a web application server and/or a servlet for handling imagery-coloring. The scalable graphic image may use any image format, including the Scalable Vector Graphics (SVG) format.

The server may include a servlet program that parses the URL to extract the specified color codes and locate the identified image. The image file may be loaded into a temporary buffer, and the servlet may identify placeholders in the image code that may be replaced using the received color codes from the URL. Placeholders in the image code at the servlet may include any text string and may be coupled with valid color codes. Examples of placeholders may include "COLOR", "COLOR1", "COLOR3_#ffee80", and/or the like.

Color codes may be matched with placeholders using a variety of different techniques, and replacements may be made such that the image code includes valid color codes for each of its color attributes. For example, color codes may be matched with placeholders based on an order in which each appears in their respective source files. Color codes may be matched with placeholders based on naming conventions, based on references in the color codes themselves, and/or based on similarities between color codes and default colors associated with the placeholders. Any placeholders that are not matched with color codes can use default values that are loaded from a separate repository or embedded in the image code itself.

After replacing the placeholders, the image file in the memory buffer may include valid and updated colors for each color attribute in the scalable graphic image. The image file for the scalable graphic image can then be sent back to the client device, where it may be rendered and displayed as an image.

This process reduces the number of copies of the image that need to be maintained at the client device and/or the server, thereby reducing memory usage. This process also offloads the processing involved with re-coloring the image to the server and away from the client device. This also allows scalable graphic images to be re-colored when they are referenced as attributes and background images, or using other tags not specifically designed for scalable graphic images.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

This disclosure describes methods, devices, and systems for coloring and re-coloring scalable graphic images used in client-side applications. Scalable graphic images can be embedded in HTML or CSS pages natively using the <SVG> tag, which allows different portions of the image to be readily manipulated and re-colored. However, when such an image is embedded as a traditional image in an <img> tag or assigned as a background image on a <div> or other HTML tag, traditional HTML, CSS, and/or JavaScript is unable to re-color individual portions of the image at the client device. Instead of generating multiple versions of the same image having different colors, the embodiments described herein describe a server-side solution that can re-color scalable graphic images dynamically at runtime.

The browser code that is rendered by the web application may include references to scalable graphic images in <img> tags or as background images on <div> or other HTML tags that are stored on a servlet. When such an image is encountered by the web application, it makes a request to retrieve the image file from the servlet using the URL in the browser code. The URL may include an address for the servlet and may be embedded with color codes that correspond to different portions of the image. When the servlet receives the request, it can parse the URL to extract an image name and one or more color codes. The servlet can then load the corresponding image file into a memory buffer and search the image file for placeholder tokens for different color codes. Once the placeholder tokens are discovered, they can be replaced using the color codes from the URL and/or default values stored at the server. The updated image file at the servlet can then be transmitted back to the client device, where the web application can render the scalable graphic image with the dynamic color adjustment. To re-color the image, the code executing within the browser operating on the client device can just switch the URL in the <img> or <DIV> tag such that the desired colors are embedded within the URL. This allows scalable graphic icons and other images to be re-colored based on explicit color selections by a user (e.g., using a color wheel) or in response to user interactions with the web application display (e.g., button clicks, hovering over a button, etc.).

Figure 1:
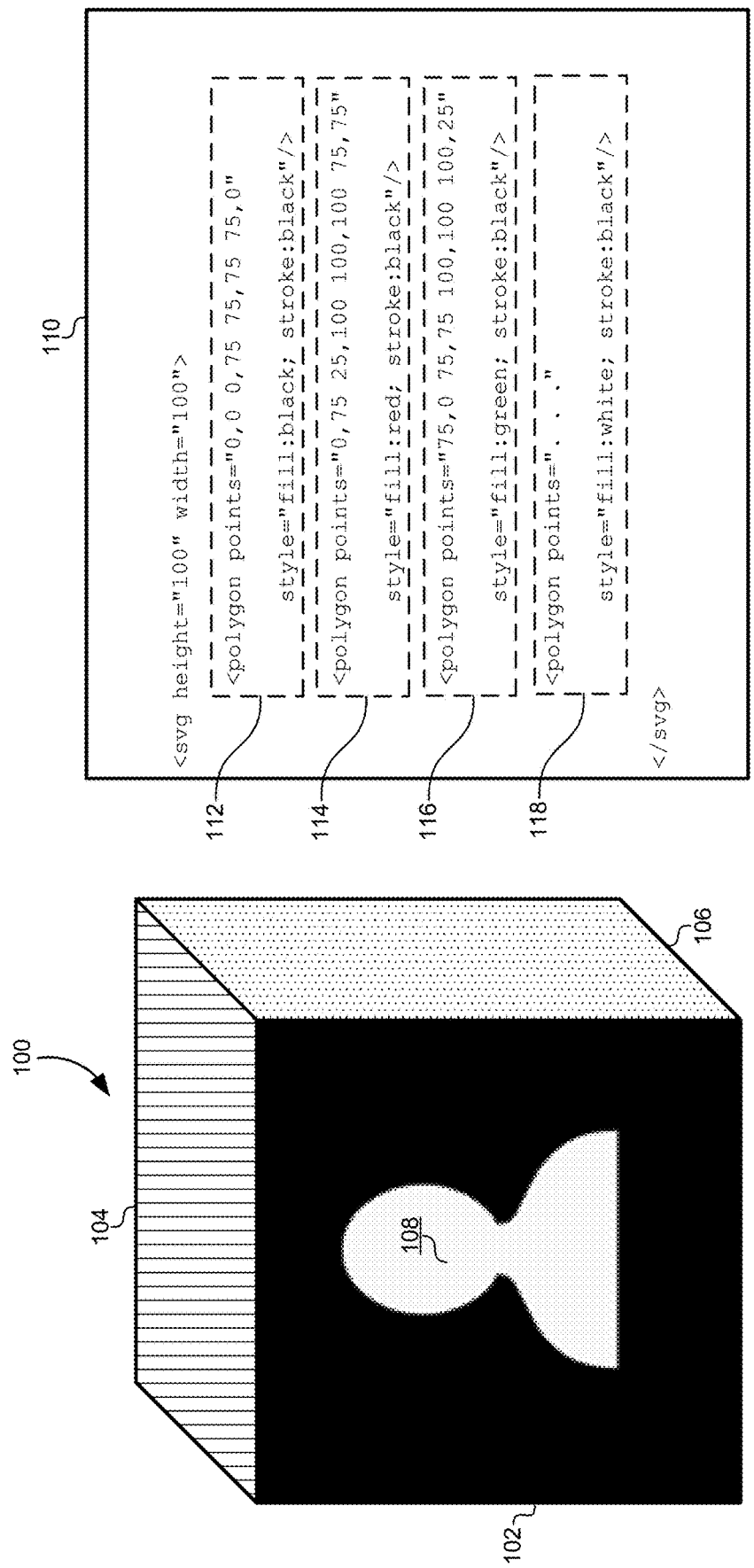
FIG. 1 illustrates a scalable graphic image with accompanying image code, according to some embodiments.

FIG. 1 illustrates a scalable graphic image 100 with its accompanying image code 110, according to some embodiments. As used herein, the term "scalable graphic image" may refer to any image format where the image is rendered based on discrete objects that can be scaled according to a display size and/or resolution. For example, a scalable graphic image may include lines, circles, squares, arcs, polygons, paths, text, and other graphic objects that may be defined using sets of points, mathematical equations, and/or attributes. For example, a scalable graphic image may define a line based on coordinates for the endpoints of the line rather than defining pixels along the length of the line. A scalable graphic image may define a circle by a set of coordinates defining the center of the circle and a distance defining the radius of the circle rather than coloring individual pixels to depict the circle. A scalable graphic image may also include effects that may be executed on the graphic objects, such as filters, blurs, offsets, rotations, scaling, and/or other graphic effects. For example, a scalable graphic image may define a filter that uses a Gaussian blur effect, and then apply that filter to one of the objects in the image, such as a line or a circle. Other effects may include gradients, motion paths, and/or animations. For example, a scalable graphic image may define a motion path and cause an object in the image to move along the motion path as an animation.

Each of the elements in a scalable graphic image described above may be associated with various attributes, including color attributes. Any of the scalable graphic objects in an image may include a color attribute that determines a color in which the object is rendered for display. Various effects may also be associated with color attributes that influence the effect, such as a color gradient or the color properties of a filter. Individual elements may also be associated with a number of different color attributes. For example, a rectangle object may include a fill color, a stroke (i.e., outline) color, an opacity, and other color attributes that may define various color aspects of the display of the rectangle. Therefore, each scalable graphic image may include numerous references to various colors within an associated image file.

In FIG. 1, the scalable graphic image 100 may represent a cube. Although there may be various ways to graphically define the cube within the image code 110 for the scalable graphic image 100, this example may define the scalable graphic image 100 as a combination of four two-dimensional shapes. A first polygon 102 may define the front face of the cube. A second polygon 104 and a third polygon 106 may define the two visible sides of the cube. Additionally, a fourth polygon 108 may be overlaid on the first polygon 102 to display an icon on the front face of the cube. Note that each of these polygons 102, 104, 106, 108 may include a fill color and/or a stroke color. For example, each of the polygons 102, 104, 106, 108 may define a stroke color to be black. The first polygon 102 may define its fill color to be black as well, while the second polygon 104 and the third polygon 106 may define their fill colors differently (e.g., red and green), and the fourth polygon 108 may define its fill color to be white.

The image code 110 that defines the scalable graphic image 100 may include tags in the code defining scalable graphic objects that may each be rendered individually and sequentially by a web application for display. In this example, code segment 112 may define the first polygon 102, code segment 114 may define the second polygon 104, code segment 116 may define the third polygon 106, and code segment 118 may define the fourth polygon 108. Note that each of these code segments 112, 114, 116, 118 may include style attributes that define a fill color and/or a stroke color for each polygon 102, 104, 106, 108. Each of these specific colors are embedded as text values in the image code 110 that defines the scalable graphic image 100. These text values may represent one of many different color codes that may be used to represent specific colors. Additional color codes are described in detail below.

Scalable graphic images may use many different code structures and/or languages to define how images should be displayed and rendered. In this example, the image code 110 may be defined using a markup language structure where individual objects are defined by specific tags. For example, this example uses the <polygon> tag to define a polygon object with its associated color attributes. Some embodiments, as illustrated in FIG. 1, may use an Extensible Markup Language (XML) format for defining the various scalable graphic objects in the image. However, the XML format is used in FIG. 1 merely by way of example, and is not meant to be limiting. Other scalable graphic images may use other markup languages or methods of defining individual scalable graphic objects that together make up the scalable graphic image.

A scalable graphic image may be contrasted from other image formats that rely on pixel colors or rasters to render the image. Pixel-based image formats define color properties for each pixel in the image. Therefore, when pixel-based images are scaled up and down, visual artifacts can be seen in the images, such as blurred edges and pixelization. In contrast, scalable graphic images may remain sharp and well defined regardless of the size of the display. As the display zooms in and/or out on the scalable graphic image, the display can re-render the image using the object definitions in the image code. Therefore, scalable graphic images can avoid the visual artifacts that have traditionally plagued pixel-based images. This makes scalable graphic images particularly well-suited for web applications where display device sizes may vary drastically. This may be particularly true as web applications are run on client devices ranging in size, including watches, smart phones, tablet computers, large display screens, projection screens, and any other type of display device.

One particular format for defining scalable graphic images is the Scalable Vector Graphics (SVG) format developed by the World Wide Web Consortium (W3C). The SVG format is an open standard where images and their behaviors are defined in XML text files. SVG images are popular for defining simple graphics in web applications. For example, SVG images may be used to represent icons or other images that may be scaled up or down depending on the size of the display. Although the SVG format may be used herein as an example for representing scalable graphic images, this example is not meant to be limiting. The embodiments described herein are compatible with any scalable graphic image format that may define individual graphic objects and/or effects that can be scaled without losing significant quality in how they are displayed on various display devices.

Figure 2:
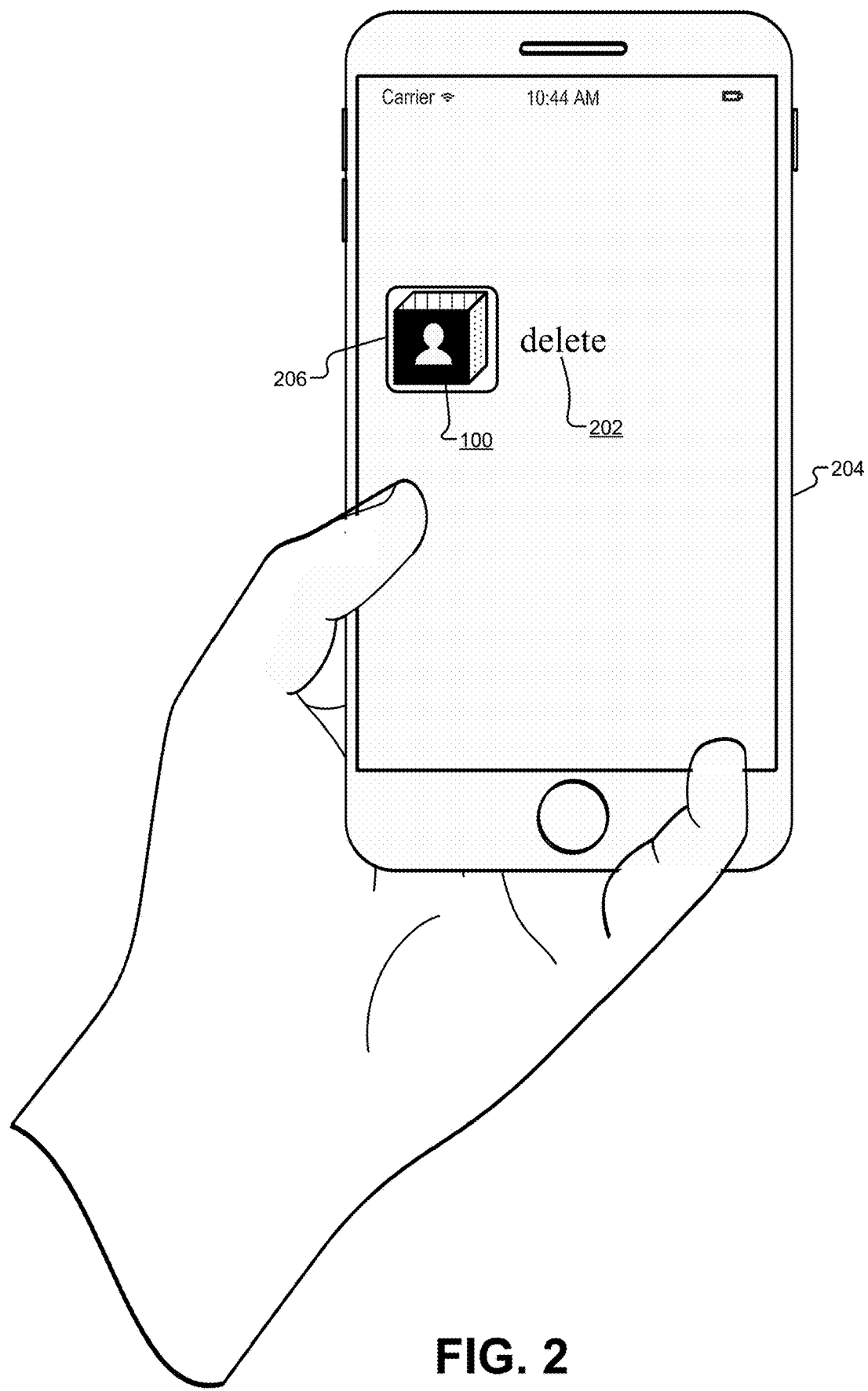
FIG. 2 illustrates a scalable graphic image as displayed on a client device, according to some embodiments.

FIG. 2 illustrates the scalable graphic image 100 as displayed on a client device 204, according to some embodiments. In this example, the client device 204 may be represented by a smart phone. Other embodiments may use other types of client devices, such as a smart watch, a personal digital assistant (PDA), smart glasses, augmented reality glasses, virtual-reality headsets, smart phones, tablet computers, laptop computers, desktop computers, messaging systems, videoconference systems, projection screens, television screens, and/or any other computing device coupled with a display device. The client device 204 may run a web application using code (e.g., HTML, CSS, etc.) received from a web server, and the code may include embedded scalable graphic images to be displayed, including the scalable graphic image 100 depicted in FIG. 2.

As described above, the code for the web application may embed the scalable graphic image 100 using the <svg> tag or other tags specifically designed for scalable graphic images. For example, the code within the <svg> tag may resemble the image code 110 illustrated in FIG. 1. When using these special tags, the client device 204 can render each of the scalable graphic objects in the image code 110 such that they are rendered on the display of the client device 204. Since color attributes are readily available in the code, they may be altered based on the operation of the web application. For example, to change the color of the face of the cube of the scalable graphic image 100, the fill attribute for that polygon may be changed by the web application to a color other than black. Thus, using tags specifically designed for scalable graphic images allows at least some parts of these images to be re-colored by the web application executing on the client device.

However, it is often useful to embed a reference to a scalable graphic image in another type of tag that is not specifically designed for scalable graphic images. For example, the <img> tag or <div> tag may be used to reference a Uniform Resource Locator (URL) for an image available over a network. This allows the code for the web application to simply include a reference to an image file stored elsewhere rather than embedding the actual image in the web application code. For example, instead of storing the object definitions shown in the image code 110 in FIG. 1, the <img> tag or <div> tag may instead point to a URL that stores the image code 110. This greatly simplifies the web application code that is downloaded and executed by the client device 204.

In the example of FIG. 2, a <div> tag may include an attribute for a background image. This tag typically does not support including native image code for a scalable graphic image as a background image. Instead, this tag may require a URL where the image code can be located. This allows the scalable graphic image to be used as a background image on any web controls, such as a button 206 that can be clicked or selected by the user.

Although using tags not specifically designed to handle scalable graphic images offers definite benefits, such as providing background images and/or simpler web application code, these tags are problematic when it comes to dynamically adjusting the display of these images. For example, these tags do not allow the client device 204 to dynamically re-color individual portions of a scalable graphic image as is allowed using the <svg> tag. For example, when the user taps or clicks on the button 206 that uses the scalable graphic image 100 as a background image in FIG. 2, the scalable graphic image 100 cannot change its color attributes because it is embedded within the control for the button 206 as a URL. However, changing color attributes of the scalable graphic image 100 may provide beneficial indications to the user regarding their interaction with the client device 204. For example, changing the color of the scalable graphic image 100 when the button 206 is tapped or clicked may indicate to the user that their tap/click successfully interacted with the button 206. Some embodiments may also change the opacity or color of the scalable graphic image 100 when the button 206 is disabled. For example, the scalable graphic image 100 can be changed to use grayscale colors indicating that the button 206 is not operable.

Other problems arise when a scalable graphic image should be re-colored to match surrounding graphic elements or conform with a selected color palette. For example, the color attributes of the text 202 that is near the button 206 can be readily altered by the web application at the client device 204. As the color attributes of the text 202 are altered, the color attributes of the scalable graphic image 100 next to the text should also be changed to match the text 202. Alternatively, if a user selects a new color palette that re-colors all of the controls, text, and other graphic objects displayed by the web application, the color attributes of the scalable graphic image 100 should also be re-colored according to the new selected color palette. When the scalable graphic image 100 is embedded as a background image or using other non-SVG tags, it cannot be dynamically adjusted to match surrounding graphic elements in the display as they change their color attributes.

The embodiments described herein solve these and other problems by embedding a URL to the scalable graphic image that is available on a server accessible through a network. When the client device 204 requests the image referenced by the URL from the server, the server can parse the URL for color codes that may be inserted in the URL by the web application. An image file at the servlet can then locate placeholder tokens in the image file that can be replaced by the color codes in the URL. The server can then send the altered image file back to the client device for rendering and display.

Figure 3:
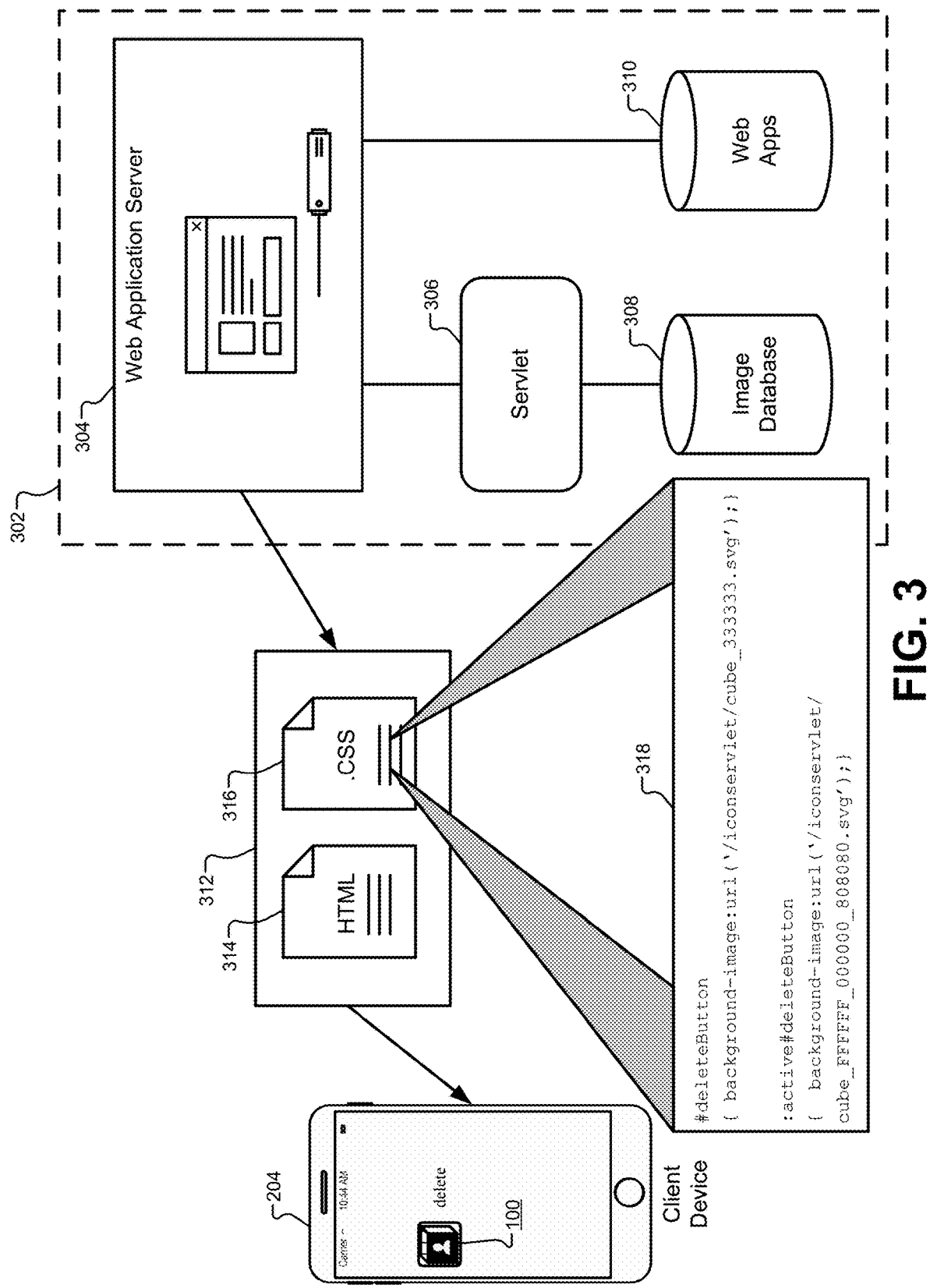
FIG. 3 illustrates a system for dynamically coloring scalable graphic images, according to some embodiments.

FIG. 3 illustrates a system for dynamically coloring scalable graphic images, according to some embodiments. The system may include a server 302. The server 302 may be a physically separate device from the client device 204. The server 302 may be located in a different physical location from the client device 204, such as in a separate building, a separate city, and so forth. Generally, the server 302 may be separated from the client device by one or more networks (e.g., a LAN, the Internet, a WAN, etc.) and/or by distances of 10 feet, 25 feet, 50 feet, 100 feet, 200 feet, 500 feet, 1000 feet, 1 mile, and/or the like. The client device 204 may operate using a different operating system from the server 302. The client device 204 may also operate using different physical resources, such as different instruction sets, different memory devices, different circuit boards, and so forth.

The server may include a web application server 304 that receives requests from the client device 204 for code to be executed as a web application. This may include webpages, JavaScript, HTML, CCS, and/or other code or markup languages that can be used to display and operate a web application on the client device 204. In some embodiments, the client device 204 may make an initial request of the application server 304 to provide code for running the web application. The web application server 304 may send application code 312 (e.g., a webpage) to the client device 204 in response to the request. The application code 312 may include files such as one or more HTML files 314, one or more CSS files 316, media files, images, and/or any other content used by the client device 204 to execute and display the web application.

For example, a CSS file 316 may include a code segment 318 that defines the operation of a delete button, such as the button 206 from FIG. 2. The code segment 318 may provide an attribute for the delete button that specifies a background image. The background image include a URL that references a specific scalable graphic image available at a servlet 306 at the server 302. Additionally, behavior for the delete button may be defined such that clicking the delete button changes the background image to a different scalable graphic image. When initially rendering the delete button, or when re-rendering the delete button as it is clicked, the client device 204 may send a request to retrieve the specified image at the specified URL. However, as described below, the servlet 306 need not simply return the image referenced in the URL. Instead, the servlet 306 can use color codes embedded in the URL to color or re-color the scalable graphic image before returning it to the client device 204. This process will be described in greater detail below.

The example of FIG. 3 illustrates the servlet 306 as part of the server 302. However, some embodiments may separate the server 302 from the servlet 306. Because the URL can address any location, the servlet 306 need not be co-located with the server 302. The example of FIG. 3 where the servlet 306 is co-located with the server 302 simplifies the URL code because the URL can use the "/iconservlet/" to refer to a location on the server 302. To use a separate servlet, the URL may instead refer to a different full server address. Additionally, the term "servlet" may refer to a program that runs on the server 302 and handles requests from the client device 204 and/or the web application server 304. However, the term "servlet" may be used interchangeably with the term "server" to emphasize that the operations of the servlet 306 may be carried out using the architecture of FIG. 3, or alternatively using other independent servers not explicitly depicted in FIG. 3.

Figure 4A:
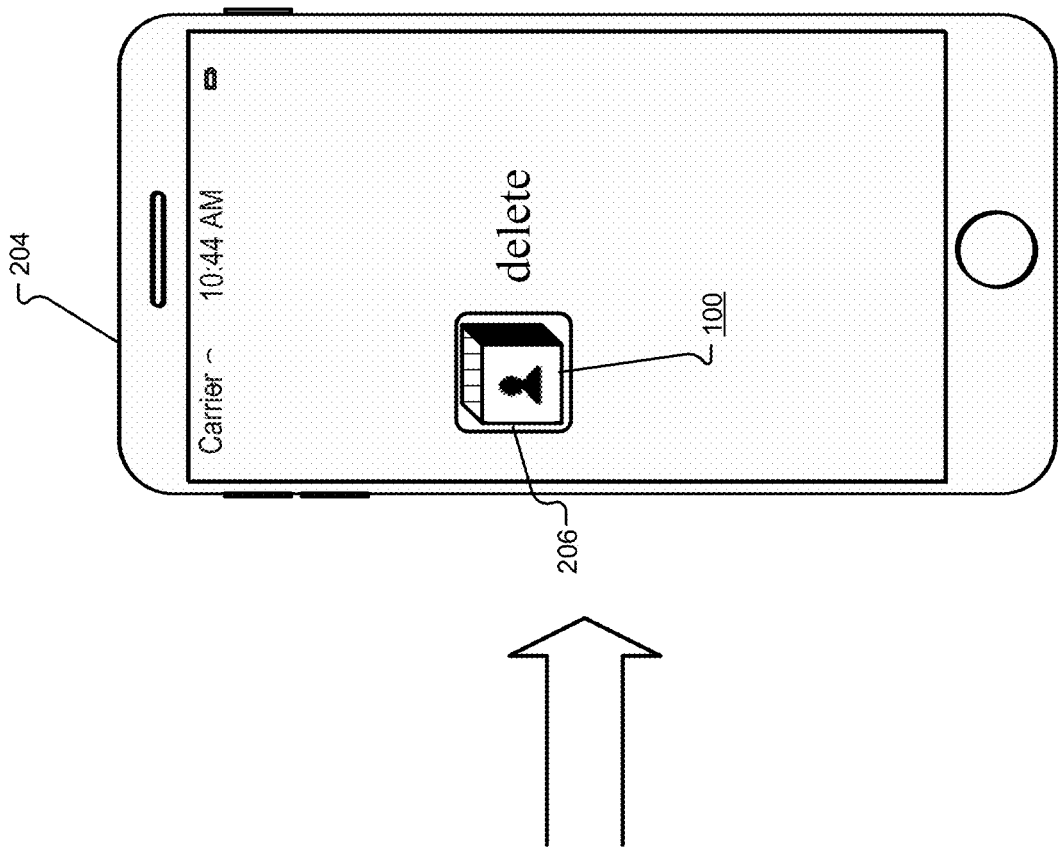
FIG. 4A illustrates a display of a web application after a button has been initially rendered on the client device, according to some embodiments.
Figure 4B:
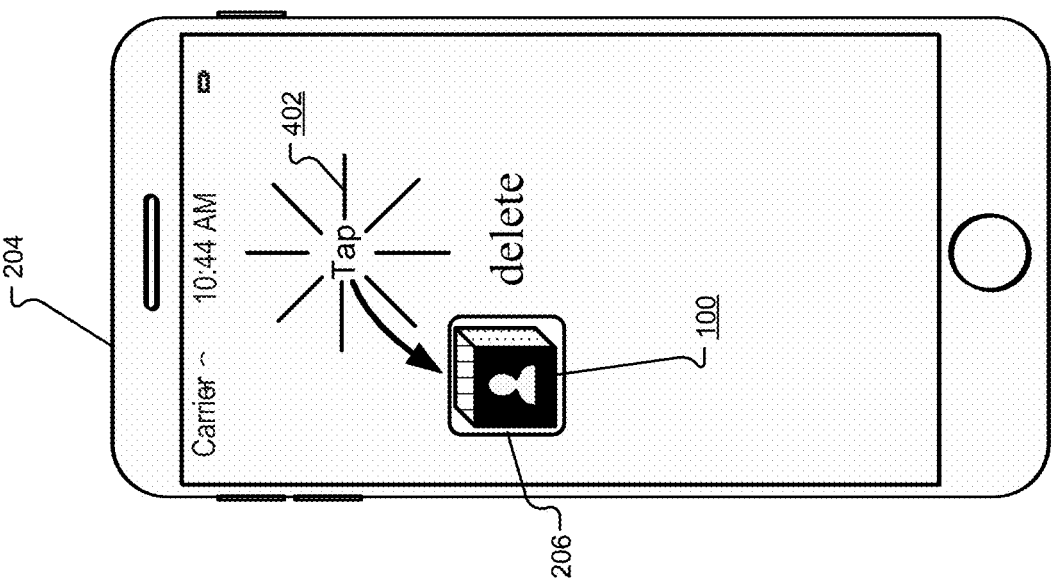
FIG. 4B illustrates a change to the color attributes of a scalable graphic image after a finger tap is received by the client device, according to some embodiments.

After the web application begins operating on the client device 204, the code governing the display and operation of the button may be executed by the client device 204. FIG. 4A illustrates a display of the web application after the button 206 has been initially rendered on the client device 204. After the button 206 is available to the user, the client device 204 may receive an input that should affect the display of the button 206. For example, the client device 204 may receive an input using a mouse or a finger gesture on a touchscreen. In the example of FIG. 4A, the client device 204 may receive a finger tap 402 that selects or clicks the button 206. FIG. 4B illustrates a change to the color attributes of the scalable graphic image 100 after the finger tap 402 is received by the client device 204. In this example, tapping the button 206 may cause the display of the scalable graphic image 100 to change color such that it is noticeably different (e.g., opposite) from its color prior to receiving the tap 402, thereby making it clear to the user that the button 206 was selected/pressed.

Figure 5B:
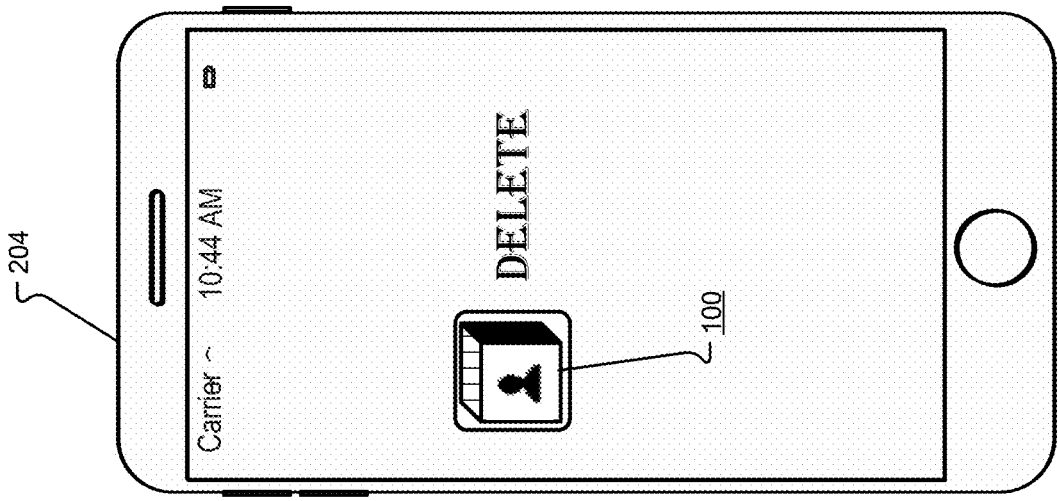
FIG. 5B illustrates how a scalable graphic image may change its color attributes to conform with a new color palette, according to some embodiments.
Figure 5A:
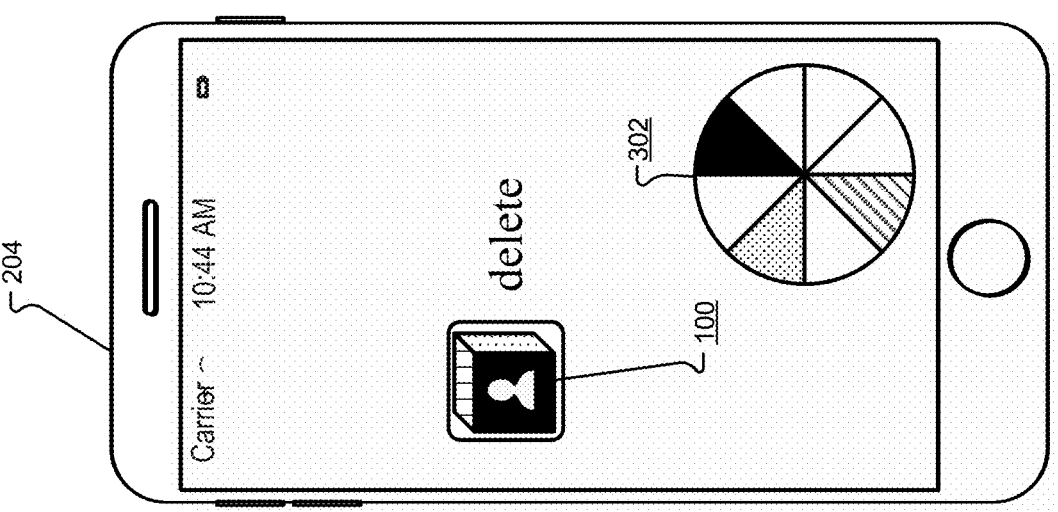
FIG. 5A illustrates a method of changing a color of a scalable graphic image in a web application, according to some embodiments.

FIG. 5A illustrates another method of changing a color of the scalable graphic image 100 in the web application. The web application may provide a color wheel 302 or other color control to the user, and the user may select individual colors or predefined color pallets for the web application display. When changing the color palette, the surrounding text and objects may change their colors to conform to the new color palette. FIG. 5B illustrates how the scalable graphic image 100 may also change its color attributes to conform with the new color palette and match the new color of the accompanying "delete" text.

Figure 6:
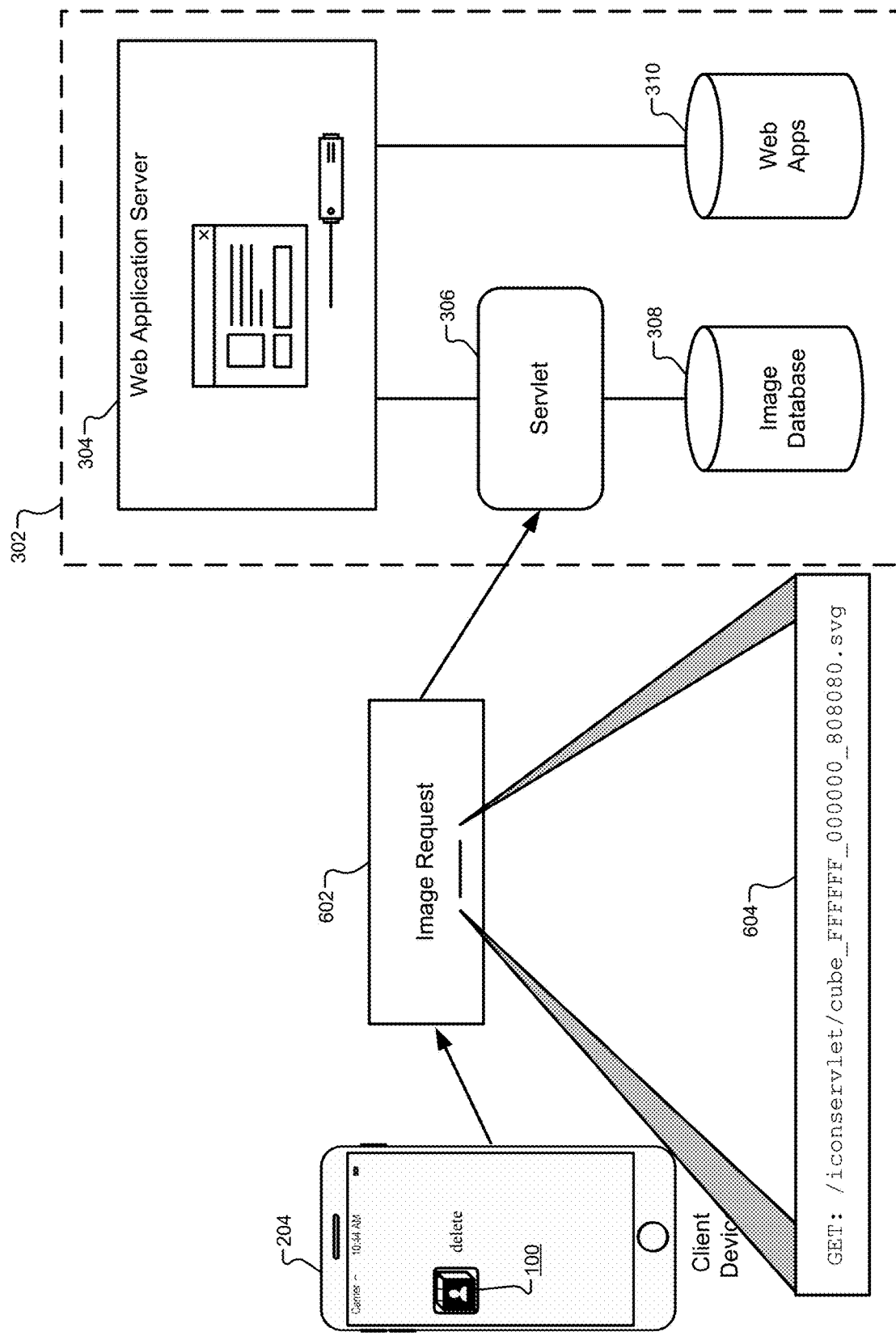
FIG. 6 illustrates an image request sent to a servlet from a client device in response to an event that changes a color attribute in a scalable graphic image, according to some embodiments.

In order to change the colors of the scalable graphic image used as a background image, a request to the servlet 306 may be sent. FIG. 6 illustrates an image request as it is sent to the servlet 306 from the client device 206 in response to an event that changes a color attribute in the scalable graphic image 100. Turning back briefly to FIG. 3, recall that the code segment 318 defined behaviors of the delete button include a change to the background image when the delete button is clicked. In this example, the code for changing the image on the delete button is:

```
background-image:url('iconservlet/
    cube_FFFFFF_000000_808080.svg')
```

From the perspective of the client device 204, this code simply requests a new image located at the specified URL. However, at the servlet 306, this request is recognized as a request for the specified image code with certain color attributes being re-colored using the values in the URL. For example, the above URL may use a predefined format such as:

```
<server_addres>/<image_name>_
    [<color_codes>].svg.
```

In this example, the first portion of the URL text string may specify a server address, such as the "iconservlet" that references the servlet 306 relative to the server 302 in FIG. 3. The second portion of the URL text string may identify an image. This may include an image file name, a reference number, a hash value, or any other text string that may be used or decoded by the servlet 306 to identify a location and/or name of an image file. The third portion of the URL text string may identify one or more color codes. Some embodiments may alternatively identify zero or more color codes to utilize default colors as described below. These color codes may be separated by any text delimiter. This example uses a "_" character to separate the image identifier and the individual color codes. Individual color codes may also be separated by the same or different text delimiters. Some embodiments may use other delimiters such as dashes, parentheses, commas, semicolons, colons, non-displayed text patterns and/or the like.

The color codes specified in the URL may identify specific colors to be used by the servlet 306 for re-coloring individual portions of the scalable graphic image 100. These color codes may use any code format for distinguishing colors. For example, color codes may use a six-digit hexadecimal code as illustrated in FIG. 3 (e.g., #333aaa). Other embodiments may use RGB decimal codes ranging from 0-255. Some embodiments may use a four-channel code to add an alpha channel that specifies a level of transparency used when displaying the color. Some embodiments may use hexadecimal triples, and/or other known color codes that can be represented in a text string. Some embodiments may use HSL and/or HSV attributes. Some embodiments may use an enumerated list of color names, such as "black", "red", and/or "gray".

Returning to FIG. 6, a new URL may be sent to the servlet 306 when the button 206 is clicked. The new URL may list one or more color codes for re-coloring the scalable graphic image 100 that may be different from color codes used to previously color the scalable graphic image 100. In this example, the new URL is:

/iconservlet/cube_FFFFFF_000000_808080.svg.

As was the case for the code segment 318 in FIG. 3, a code segment 604 that includes this URL may include color codes that are represented as a six-digit hexadecimal number. This URL again refers to the servlet 306 (e.g., "iconservlet") and requests an image named "cube." Following the image identifier, the URL lists three specific color codes, namely #FFFFFF, #000000, and #808080, representing white, black, and gray, respectively. As described below, the servlet 306 can use these color codes to re-color specific sections of the "cube" image.

Figure 7:
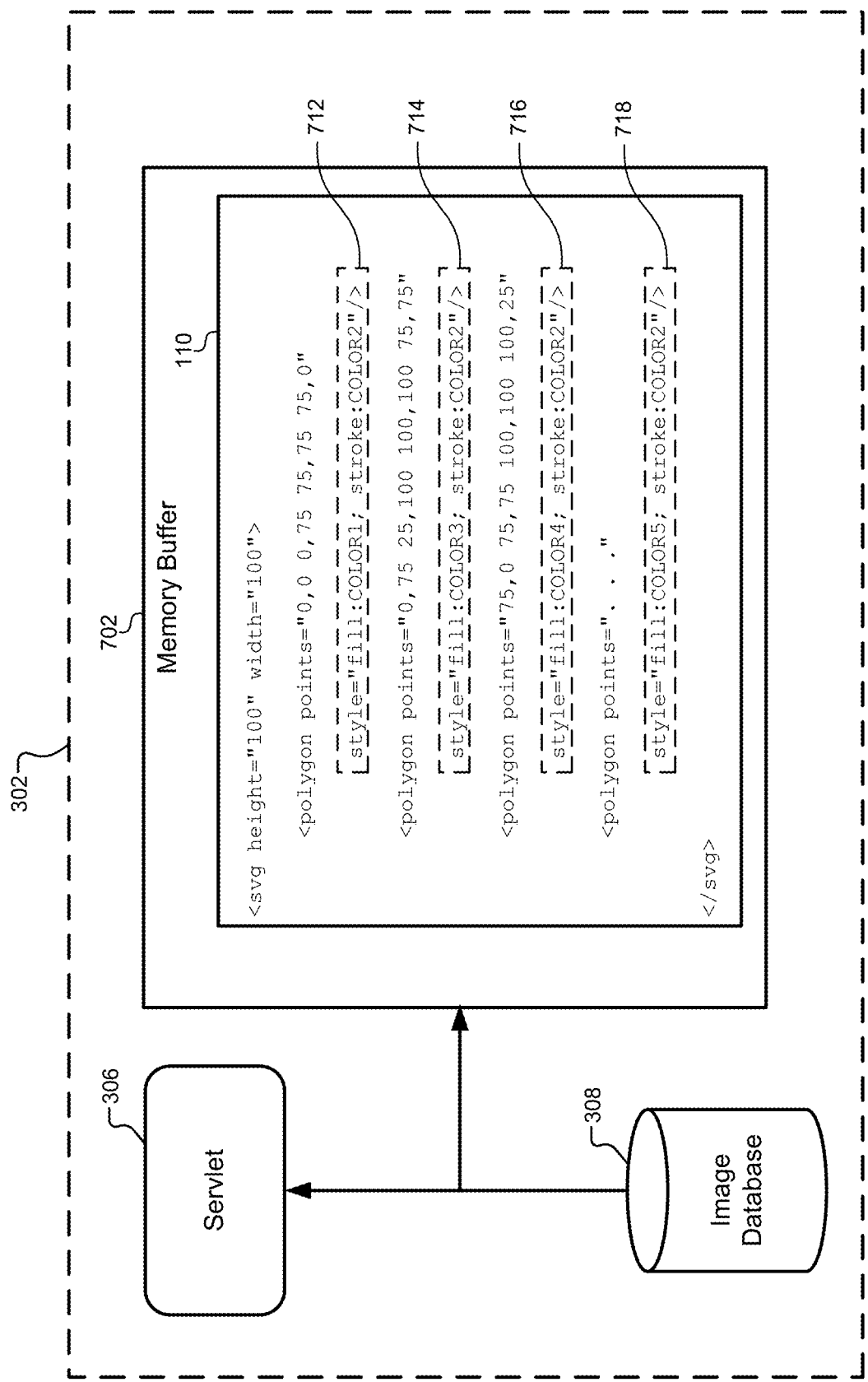
FIG. 7 illustrates how a servlet can identify and load an image file from a URL, according to some embodiments.

FIG. 7 illustrates how the servlet 306 can identify and load an image file from the URL, according to some embodiments. After receiving the URL, the servlet 306 can parse the URL using, for example, regular expression techniques to identify the image identifier and/or each of the color codes. The image identifier may then be used by the servlet 306 to locate a specific image file that includes image code for displaying the scalable graphic image. In some embodiments, the image identifier may include a filename for the image. The servlet 306 may have access to an image database 308, and the image database 308 may be accessed using the parsed file name to retrieve the corresponding image file. In some embodiments, the servlet 306 may store images in a known directory. Therefore, rather than appending the entire directory pathway to the image identifier in the URL, the URL may simply identify the path and/or image filename relative to the known directory pathway. The servlet 306 can then append the known directory pathway to the path and/or filename retrieved from the URL to find the corresponding image file. Some embodiments may use other encodings to specify the corresponding image file. For example, some URLs may use a hash code or numeric identifier that can then be used by the servlet 306 to locate a corresponding image file.

After locating the corresponding image file, the servlet 306 can load the image file into a memory buffer 702. This may create a copy of the image code from the stored image file in the image database 308. This copy of the image file in the memory buffer 702 allows the image code 110 to be edited independently from a master copy of the image code stored in the image database 308. This allows the same master copy of the image to be reused repeatedly as the image is re-colored in subsequent requests. In some embodiments, changes made to the image code 110 in the memory buffer 702 are not stored back in the image database 308, but rather are discarded after contents of the memory buffer 702 are sent back to the client device.

The image file may include image code 110 that includes one or more placeholders for color attributes. As described above, scalable graphic objects in the image code 110 may include color attributes, such as a fill color, a stroke color, and so forth. For example, the first polygon corresponding to the face of the cube illustrated in FIG. 1 may include color attributes 712 for a fill color and a stroke color. Similarly, the second polygon may include color attributes 714, the third polygon may include color attributes 716, and the fourth polygon may include color attributes 718. Each of these color attributes 712, 714, 716, 718 may include color codes as described above that specify specific colors using hexadecimal encodings, RGB values, and so forth.

Additionally, each of these color attributes 712, 714, 716, 718 may also include placeholders for color attributes. For example, the placeholders in FIG. 7 may include text strings such as COLOR1, COLOR2, COLOR3, COLOR4, and COLOR5. These placeholders may be identified by the servlet 306 in the memory buffer 702 as color attributes that can be altered by the servlet 306 using the color codes included in the URL. Note that the specific alphanumeric strings representing the placeholders for the color attributes in FIG. 7 are provided only by way of example and are not meant to be limiting. Other embodiments may use different text strings and/or other identifiers that can be distinguished from other text in the image code 110.

Figure 8:
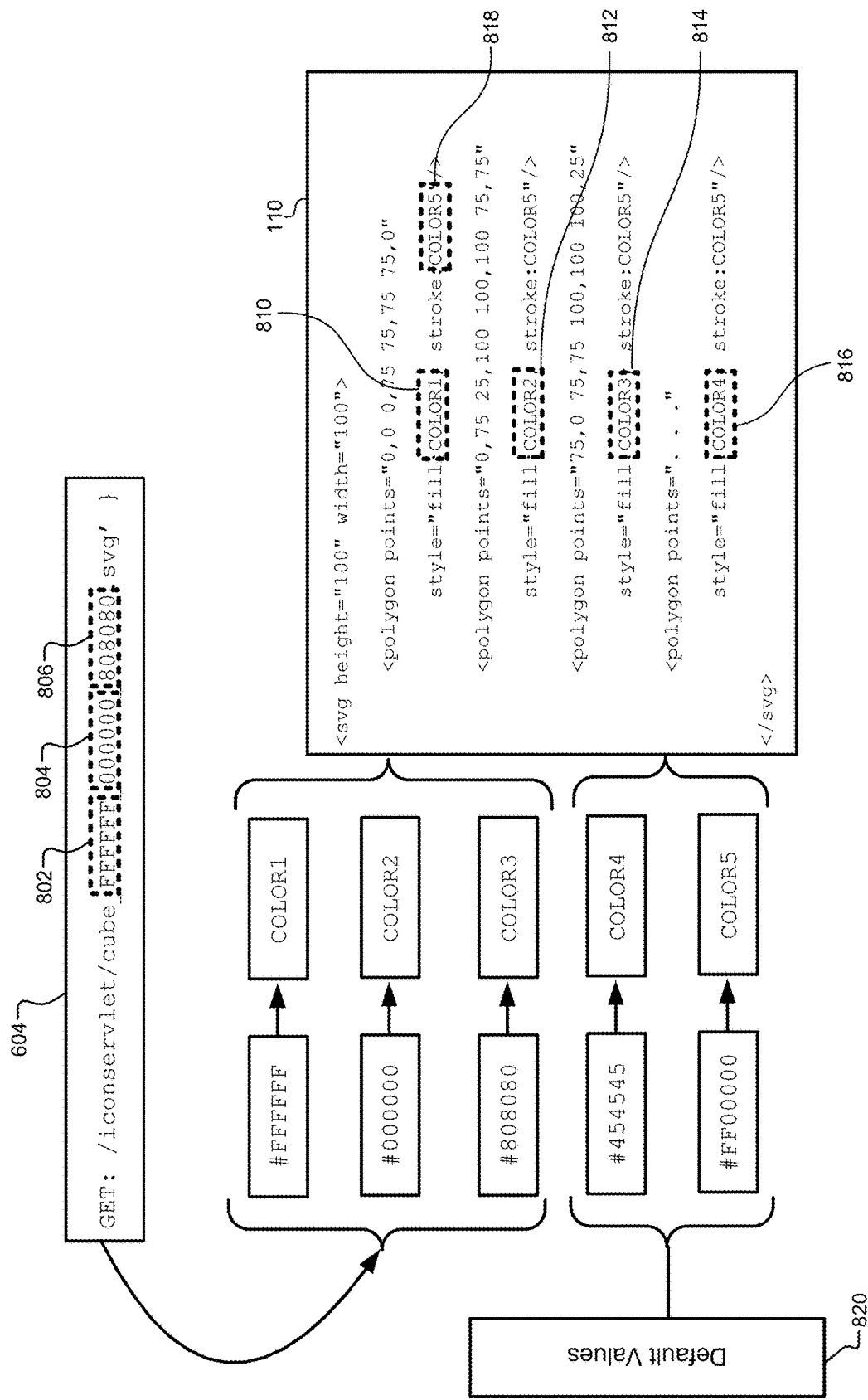
FIG. 8 illustrates a process by which a servlet may replace placeholders for color attributes with color codes from a URL, according to some embodiments.

FIG. 8 illustrates a process by which the servlet may replace placeholders for color attributes with color codes from the URL, according to some embodiments. As described above, the servlet can parse the URL 604 to identify a list of color codes 802, 804, 806. Additionally, the servlet can parse the image code 110 to locate a list of placeholders for color attributes of scalable graphic objects in the image code 110. The servlet may then match the color codes 802, 804, 806 from the URL 604 with the placeholders 810, 812, 814, 816, 818 from the image code 110 to re-color this specific instance of the scalable graphic image.

Various embodiments may use different methods for matching the color codes 802, 804, 806 with the placeholders 810, 812, 814, 816, 818 from the image code 110. Some embodiments may match the placeholders with the color codes based on an order in which each appears in their respective source. For example, color codes may be designated based on an order in which they appear in the URL 604. Therefore, color code 802 ("#FFFFFF") may be designated as color code 1, color code 804 ("#000000") may be designated as color code 2, and color code 806 ("#808080") may be designated as color code 3. Similarly, the placeholders may be designated based on an order in which they first appear in the image code 110. In this example, placeholder 810 ("COLOR1") may be designated as placeholder 1, placeholder 812 ("COLOR5") may be designated as placeholder 2, placeholder 814 ("COLOR2") may be designated as placeholder 3, placeholder 816 ("COLOR3") may be designated as placeholder 4, and placeholder 818 ("COLOR4") may be designated as placeholder 5. Color codes may then be matched with placeholders based on this ordering. For example, color code 802 may be matched with placeholder 810, color code 804 may be matched with all placeholder 818, and color code 806 may be matched with placeholder 812.

In some embodiments, the color codes 802, 804, 806 in the URL 604 may be designated based on their order in the URL, and the placeholders in the image code 110 may be designated based on an alphanumeric value in the text of the placeholder itself. For example, placeholders may use a known token (e.g., "COLOR") with a numeric value appended to the end of the known token (e.g., "COLOR1") to distinguish the placeholders from each other. The placeholders may then be designated based on these numeric values such that they can be matched with the corresponding color codes in the URL 604.

Some embodiments may use other methods of matching color codes with placeholders. For example, some color codes may include a text string that identifies a specific placeholder that is matched with the color code (e.g., "COLOR1=#FFFFFF"). These embodiments may match color codes with placeholders based on the URL, then find the corresponding placeholders in the image code 110 for replacement. Other embodiments may use other matching methods, including any method that may produce one or more matches between color codes in the URL 604 and placeholders identified in the image code 110.

In some embodiments, the placeholders may be or may include text strings that represent actual color codes. For example, instead of using "COLOR1" as the placeholder, an actual color such as "#FFFFFF" may be used. The servlet may parse the image code 110 to identify every instance of the color code "#FFFFFF" and designate these instances as placeholders. As described above, the first color occurring in the image code 110 may be considered a placeholder that is matched with the first color code 802 in the URL 604. Therefore, the term "placeholder" need not be interpreted to exclude valid color codes. In this case, the image code 110 may be rendered without replacing any values in the image code 110. Because the placeholders are also valid color codes, the image code 110 loaded into the memory buffer may represent an image with default values. Unless these default values are changed by the URL 604, the servlet may return an image file with unaltered or partially altered image code 110 to the client device. This may embed default values in the image code 110 such that the image code 110 may represent a valid image at any time, before, after, or during the placeholder replacement process. Note that some embodiments may limit the term "placeholder" to a text string that does not include valid color codes to avoid confusion in the image code 110 and/or to require replacement of the placeholders before the corresponding image can be rendered.

In the example of FIG. 8, the URL 604 includes only three color codes 802, 804, 806. However, the image code 110 includes five placeholders. As described above, some embodiments may use placeholders that represent valid color codes. Therefore, instead of using "COLOR4" and "COLOR5", the placeholders may use valid hexadecimal color codes that can be left as-is without replacement. In the example of FIG. 8, unmatched placeholders 816, 818 may also be replaced with default values 820 that are stored at the servlet 306. These default values 820 may be specific to each individual image file. Therefore, loading an image file may also include loading a set of default values 820 that are specific to the image file 110. Alternatively, the default values 820 may apply to a particular class of images, a directory of images, and/or any image stored on the servlet. Therefore, loading the image file may also include loading a set of default values 820 that can be applied to any image file on the servlet.

Placeholders that are not matched with a specific color code in the URL 604 may also be colored reusing matched color codes in the URL. For example, some embodiments may start reusing color codes in the URL 604 from the beginning of the list. In the example of FIG. 8, placeholder 816 would be matched with color code 802, and placeholder 818 would be matched with color code 804. Some embodiments may match also placeholders to color codes based on how similar the color codes are to any default values for the placeholders. For example, the URL 604 may designate color codes that represent shades of red, green, and blue. Placeholders in the image code 110 may have default values that are also shades of red, green, and blue. The placeholders may be matched to the color codes by determining which color code is closest to the default value for the placeholder. This determination may be made by subtracting the color codes from the default color code of the placeholder, or by using string similarity algorithms that are token-based, distance-based, sequence-based, and so forth. These algorithms may include calculating a Hamming distance, calculating a Levenshtein distance calculating a Jaro-Winkler distance, using a Jaccard index, determining Ratcliff-Obershelp similarity, and so forth. These embodiments allow the client device to change shades of colors in the scalable graphic image without knowing the number of placeholders.

After matching color codes with placeholders using any of the methods described above, the servlet may replace any matched placeholders in the image code 110 with the corresponding color code from the URL 604 and/or from the default values 820. Note that some embodiments may make zero or more matches between placeholders and color codes. If no matches are made, this process may include replacing all placeholders with default values 820 or leaving default values doubling as placeholders in the image code 110. In cases where the placeholders include text strings that also represent valid color codes, this replacement process may leave the placeholder text as-is, or may remove any prefixes or other textual indicators used to indicate that a placeholder is also a color code. For example, a placeholder may include be "COLOR4_#FFFFFF", and the replacement process may remove the "COLOR4_" prefix to leave the remaining default color code. As described above, these changes to the image code 110 may be executed in the memory buffer 702 such that a master copy of the image file need not be altered.

Figure 9:
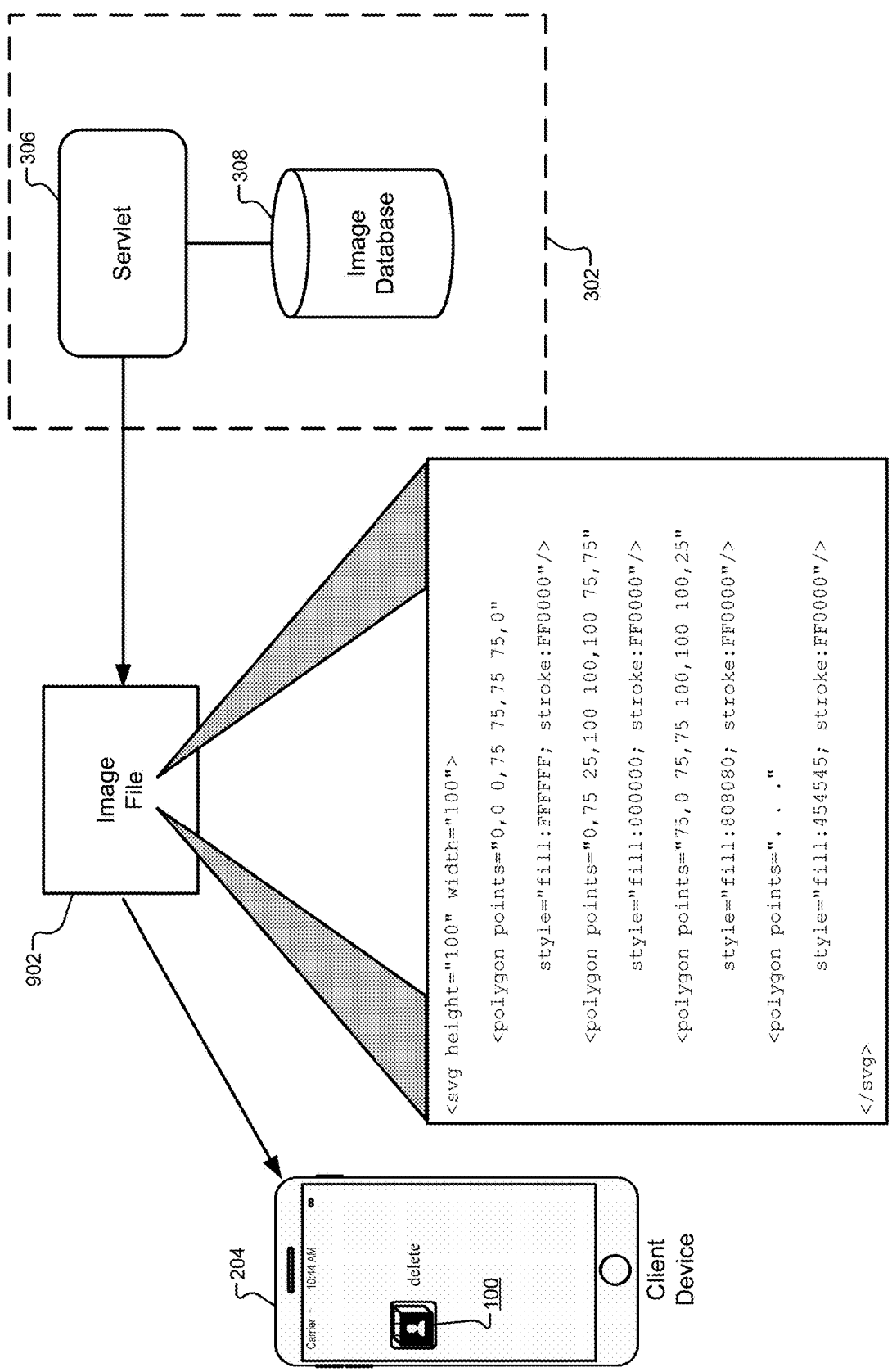
FIG. 9 illustrates a response sent from a servlet to the client device with a re-colored scalable graphic image, according to some embodiments.

FIG. 9 illustrates a response sent from the servlet 306 to the client device 204 with a re-colored scalable graphic image, according to some embodiments. After the replacement process described above, the contents of the memory buffer at the servlet 306 can be sent as an image file 902 to the client device 204. At this point, the image file 902 may include valid color codes for every color attribute that was previously associated with a placeholder at the servlet 306. When the client device 204 receives the image file 902, it may appear as any other image file retrieved using a URL. The client device 204 may simply render and display the scalable graphic image represented by the image file 902 without any special code or requiring any special knowledge of the process carried out by the servlet 306.

This process allows the client device 204 to dynamically re-color a scalable graphic image by storing the desired colors in URLs that are embedded code that handles any inputs and/or events of interest. For example, code handling the disablement of the button 206 may include a URL to the cube image with grayscale values as the color codes. When an event occurs that disables the button, the URL with the grayscale color codes may be sent to the servlet 306, and the servlet 306 may return an image file 902 with the color attributes of the cube colored using the grayscale color codes. This allows the client device 204 to simply store a plurality of URLs that correspond to different image colorings for different events. One advantage provided by these embodiments is that only a single copy of the image needs to be stored at the servlet 306. Instead of storing multiple copies of the image, each having different values stored in their color attributes, a single image can be stored at the servlet 306 that can be edited dynamically at runtime with new color values as needed.

Figure 10:
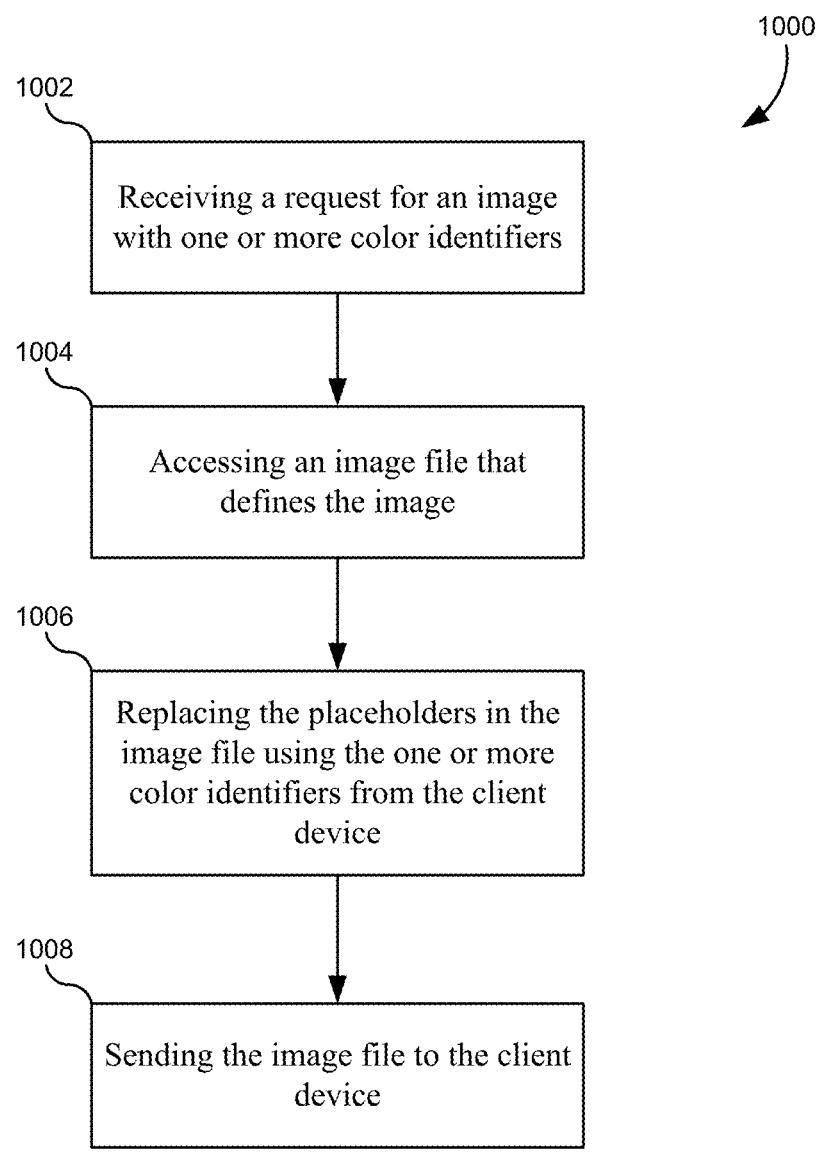
FIG. 10 illustrates a flowchart of method for dynamically coloring or re-coloring scalable graphic images, according to some embodiments.

FIG. 10 illustrates a flowchart 1000 of method for dynamically coloring or re-coloring scalable graphic images, according to some embodiments. This method may be carried out by a servlet as illustrated in the figures above. This method may also be carried out by any other server or any of the computing devices described below in relation to FIGS. 11-13. The steps or operations of this method may be embodied in instructions that are stored on a non-transitory computer-readable medium. These instructions may cause one or processors to perform the operations described below. These instructions may also be stored on one or more memory devices. The memory devices, computer-readable mediums, instructions, processors, and various other computing hardware and/or software for implementing these embodiments are described below in relation to FIGS. 11-13.

The method may include receiving a request for an image, where the request includes one or more color identifiers (1002). The request may be received by a server from a client device. In some embodiments, the client device may include a mobile computing device running a web application, and the image may include an icon that is displayed in the web application. The image may also be used as a background image for a control or other div/object in the web application. The color identifiers may be implemented using any of the color codes described above. For example, the color identifiers may include hexadecimal color codes, RGB color codes, and so forth. The request may include a URL with a server address and/or an image identifier, such as an image filename.

The method may also include accessing an image file that defines the image (1004). The image may include a scalable graphic image, such as an SVG image. The image file may also include one or more scalable graphic objects for rendering or displaying the image. The scalable graphic objects may include lines, rectangles, circles, arcs, effects, gradients, animations, motions, and so forth. These objects may be represented by a markup language in the image file, such as XML. The image file may also include one or more placeholders for color attributes of the scalable graphic objects. These placeholders may include text strings, and the placeholders may or may not include alphanumeric strings and/or numeric identifiers. Accessing the image file may include loading a copy of a master image file into a memory buffer.

The method may additionally include replacing the one or more placeholders in the image file using the one or more color identifiers from the client device (1006). This step may include matching the one or more placeholders with the one or more color identifiers in the request using any of the methods described above. This may include designating placeholders based on alphanumeric values and/or on a position in which they first occur in the image file. This may also include designating color codes based on where they first appear in the request. The placeholders may be replaced in the memory buffer such that a master copy of the image file is not altered at the servlet.

The method may further include sending the image file to the client device (1008). This may include sending contents of the memory buffer to the client device. The image file sent the client device may have all placeholders replaced or altered such that the color attributes are associated with valid color codes. Note that some embodiments may perform this process after first receiving an initial request from the client device to provide code for the web application, where the code defines a webpage and/or includes one or more URLs that may be used based on user inputs and/or other events that alter the image.

It should be appreciated that the specific steps illustrated in FIG. 10 provide particular methods of dynamically coloring images according to various embodiments of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
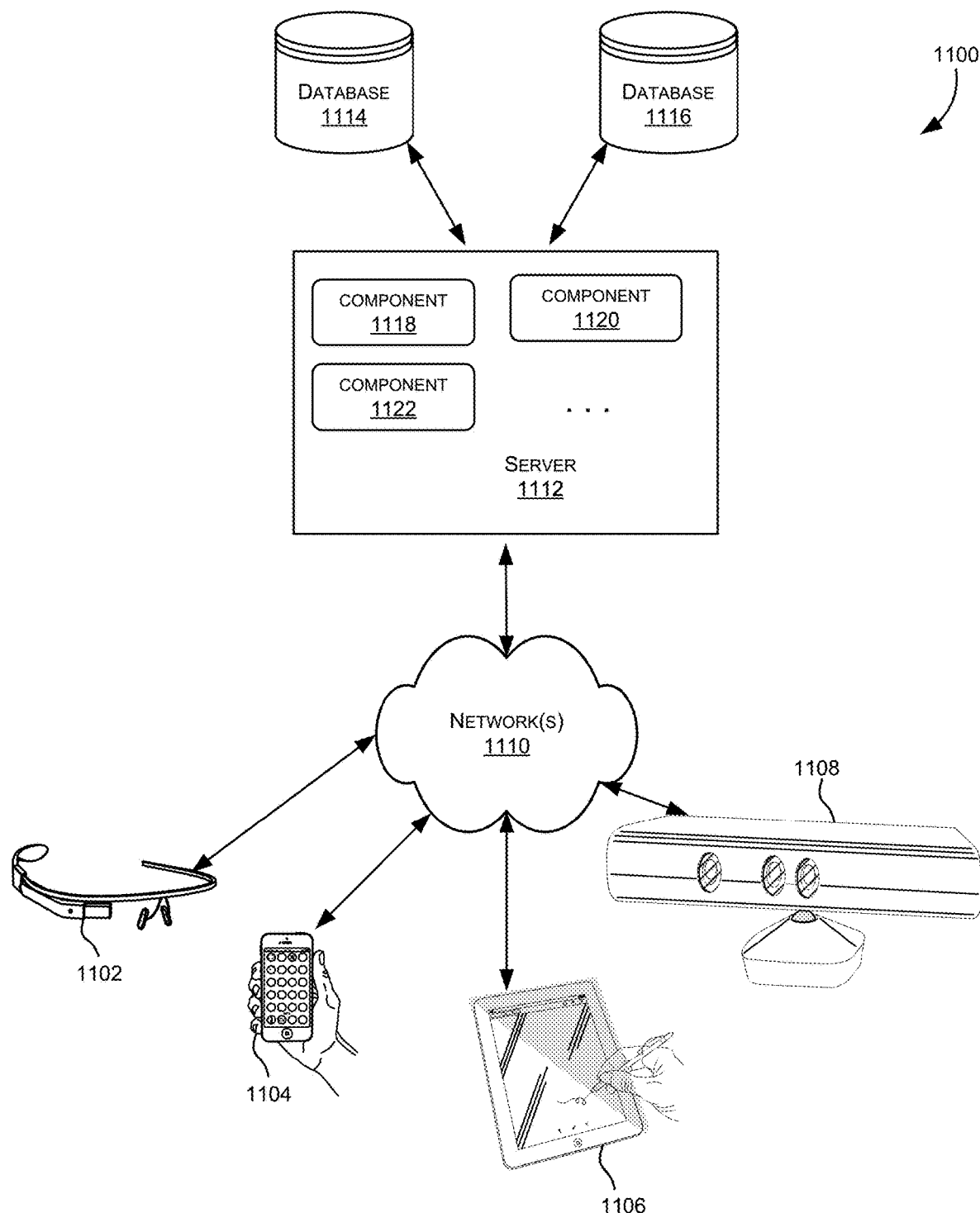
FIG. 11 illustrates a simplified block diagram of a distributed system for implementing some of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
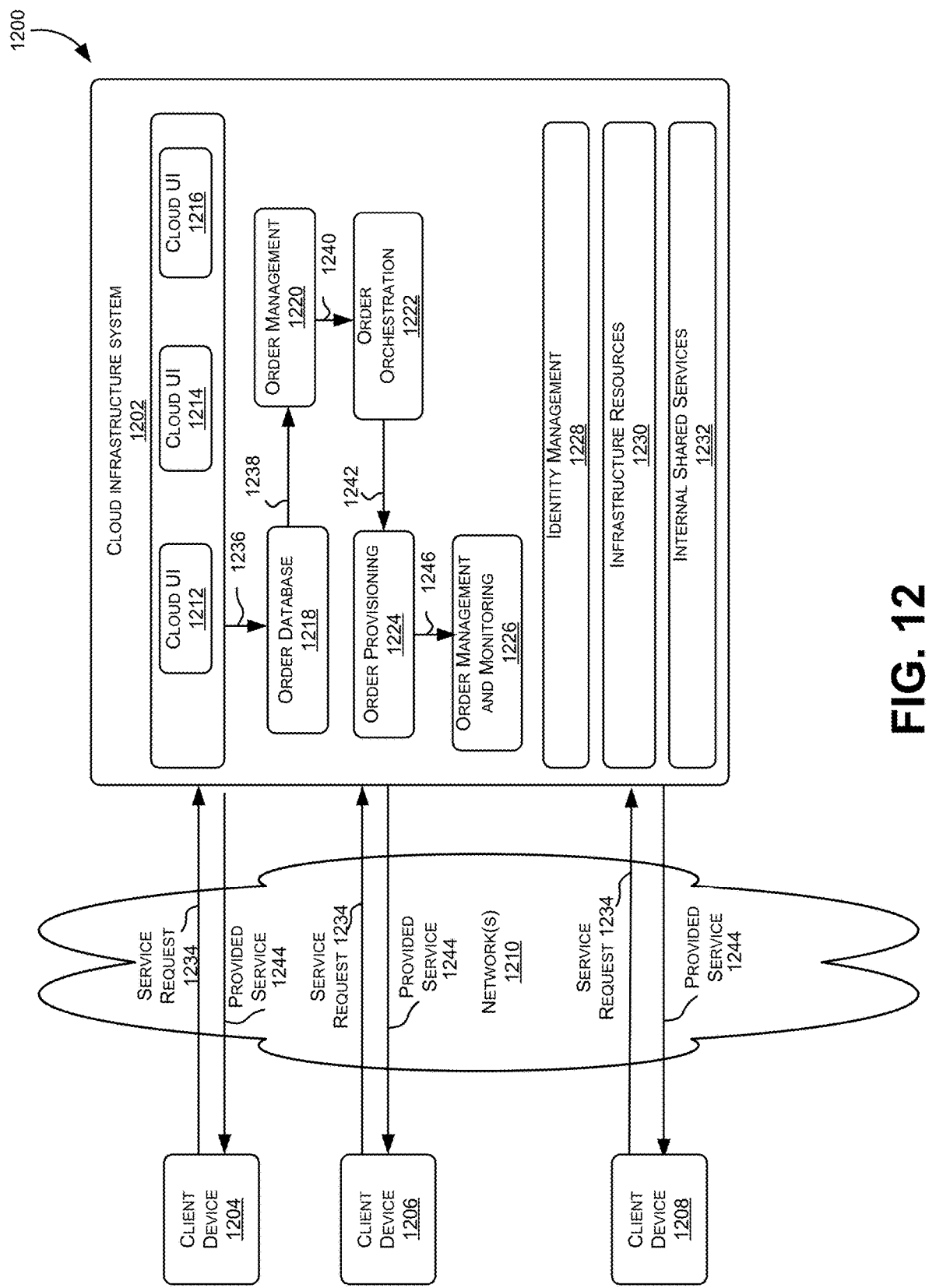
FIG. 12 illustrates a simplified block diagram of components of a system environment by which services provided by the components of an embodiment system may be offered as cloud services.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the embodiment shown in the figure is only one example of a cloud infrastructure system that may incorporate an embodiment of the invention. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for network(s) 1110.

Cloud infrastructure system 1202 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
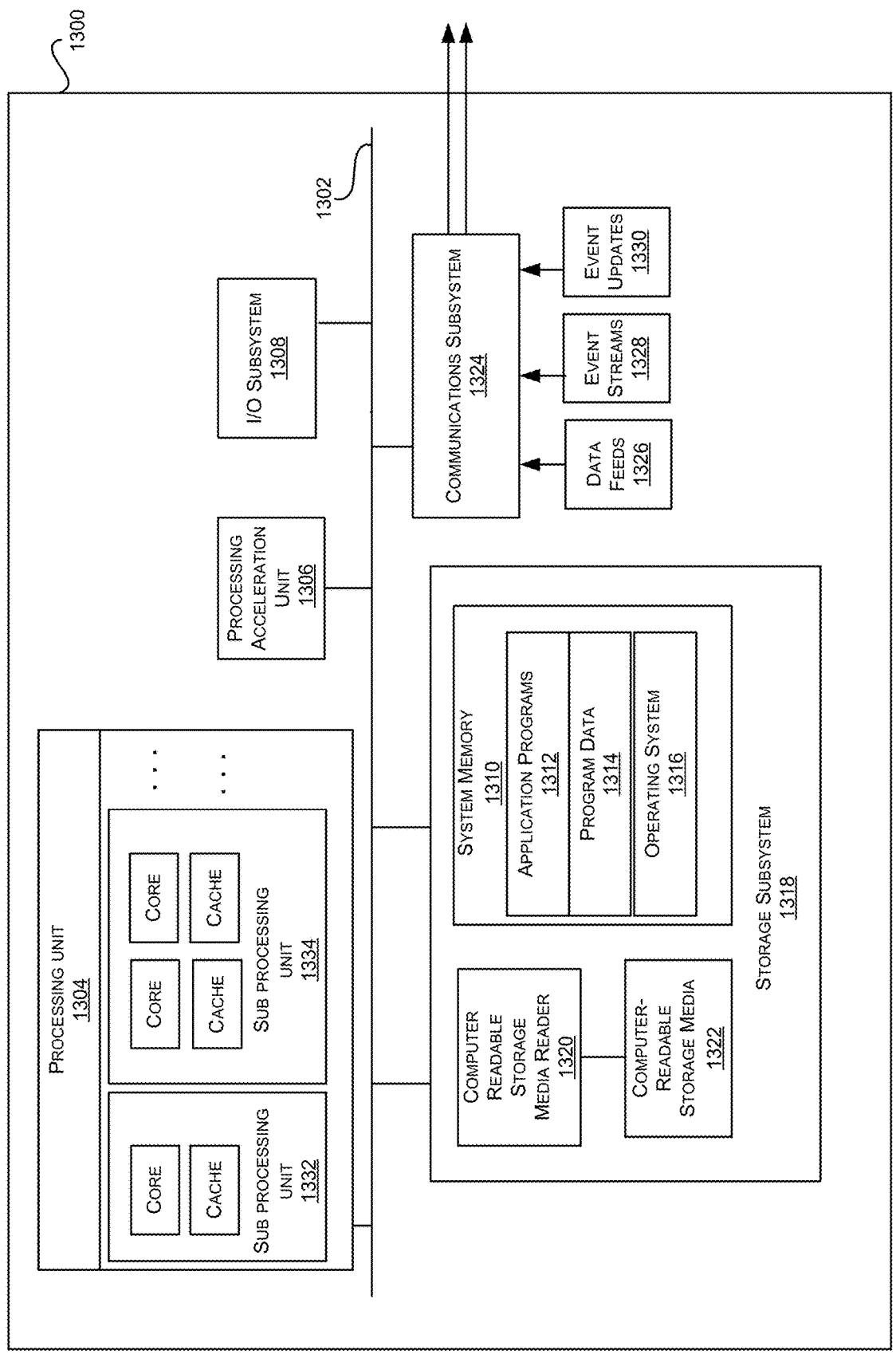
FIG. 13 illustrates an exemplary computer system, in which various embodiments may be implemented.

FIG. 13 illustrates an exemplary computer system 1300, in which various embodiments of the present invention may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present invention.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
    receiving, from a client device, a request for an image, wherein the request includes a filename for the image with one or more color codes to recolor the image embedded in the filename;
    parsing the filename to extract the one or more color codes;
    accessing an image file that defines the image, wherein the image file comprises:
        one or more scalable graphic objects for displaying the image; and
        one or more placeholders for color attributes of the one or more scalable graphic objects;
    replacing the one or more placeholders in the image file using the one or more color codes extracted from the filename for the image from the client device; and
    sending the image file to the client device.

2. The non-transitory computer-readable medium according to claim 1, wherein the client device comprises a mobile computing device running a web application.

3. The non-transitory computer-readable medium according to claim 2, wherein the image comprises an icon that is displayed in the web application.

4. The non-transitory computer-readable medium according to claim 2, wherein the image comprises a background image for a control in the web application.

5. The non-transitory computer-readable medium according to claim 1, wherein the one or more color codes comprises a hexadecimal color code.

6. The non-transitory computer-readable medium according to claim 1, wherein the image file comprises a Scalable Vector Graphics (SVG) image, and each of the one or more scalable graphic objects is represented in the SVG image by a markup language object in the image file.

7. The non-transitory computer-readable medium according to claim 1, wherein a placeholder in the one or more placeholders for color attributes comprises an alphanumeric string and a numeric identifier.

8. The non-transitory computer-readable medium according to claim 1, wherein accessing the image file that defines the image comprises loading the image file into a memory buffer.

9. The non-transitory computer-readable medium according to claim 8, wherein:
    the one or more placeholders are replaced in the memory buffer, and
    sending the image file to the client device comprises sending contents of the memory buffer to the client device.

10. The non-transitory computer-readable medium according to claim 1, wherein the request for the image is received by a server that is distinct from the client device.

11. The non-transitory computer-readable medium according to claim 10, wherein the operations further comprise:
    prior to receiving the request for the image:
        receiving a request for a webpage, wherein code defining the webpage comprises a reference to the image; and
        sending the code defining the webpage to the client device.

12. The non-transitory computer-readable medium according to claim 10, wherein the reference to the image comprises a Uniform Resource Locator (URL) for the server and a filename identifying the image file.

13. The non-transitory computer-readable medium according to claim 10, wherein the request for the image is received by a servlet operating on the server.

14. The non-transitory computer-readable medium according to claim 1, wherein replacing the one or more placeholders in the image file using the one or more color codes from the client device comprises:
    locating a first placeholder in the one or more placeholders that includes a numeric value in a name of the first placeholder; and
    replacing the first placeholder in the image file using a color code in the one or more color codes based at least in part on the numeric value.

15. The non-transitory computer-readable medium according to claim 1, wherein replacing the one or more placeholders in the image file using the one or more color codes from the client device comprises:
    locating a first placeholder in the one or more placeholders; and
    replacing the first placeholder in the image file using a color code in the one or more color codes based at least in part on:
        an order in which the color code occurs in the request for the image relative to other color codes; and
        an order in which the first placeholder first occurs in the image file relative to other placeholders.

16. The non-transitory computer-readable medium according to claim 1, wherein the request for the image comprises a text string that is dynamically generated by the client device in response to one or more user inputs.

17. The non-transitory computer-readable medium according to claim 16, wherein the one or more user inputs determines values for the one or more color codes in the request for the image.

18. A system comprising:
    one or more processors; and
    one or more memory devices comprising instructions that, when executed by the one or more processors, cause the one or more processors to perform operations comprising:
        receiving, from a client device, a request for an image, wherein the request includes a filename for the image with one or more color codes to recolor the image embedded in the filename;
        parsing the filename to extract the one or more color codes;
        accessing an image file that defines the image, wherein the image file comprises:
            one or more scalable graphic objects for displaying the image; and
            one or more placeholders for color attributes of the one or more scalable graphic objects;
        replacing the one or more placeholders in the image file using the one or more color codes extracted from the filename for the image from the client device; and
        sending the image file to the client device.

19. A method for dynamically coloring images, the method comprising:
- receiving, from a client device, a request for an image, wherein the request includes a filename for the image with one or more color codes to recolor the image embedded in the filename;
- parsing the filename to extract the one or more color codes;
- accessing an image file that defines the image, wherein the image file comprises:
  - one or more scalable graphic objects for displaying the image; and
  - one or more placeholders for color attributes of the one or more scalable graphic objects;
- replacing the one or more placeholders in the image file using the one or more color codes extracted from the filename for the image from the client device; and
- sending the image file to the client device.

\* \* \* \* \*